Patented June 11, 1940

2,204,008

UNITED STATES PATENT OFFICE 2,204,008

MANUFACTURE OF COUMARIN

Edgar C. Britton and John E. Livak, Midland, Mich., assignors to The Dow Chemical Company, Midland, Mich., a corporation of Michigan No Drawing. Application April 1, 1938, Serial No. 199,495

11 Claims. (Cl. 260—344)

This invention concerns an improved method for the manufacture of coumarin.

One of the simplest and best-known methods for the manufacture of coumarin involves the condensation of salicylaldehyde with acetic anhydride in the presence of sodium acetate. The reactions which take place in this condensation may be represented by the following equations:

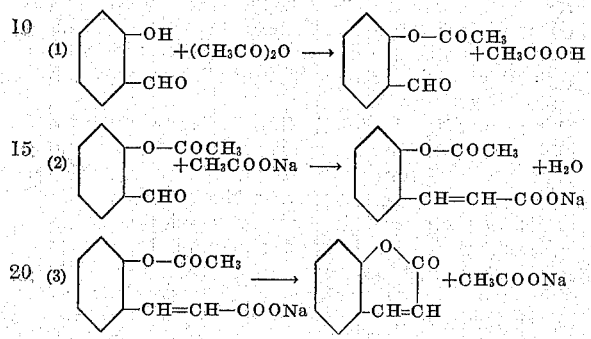

The condensation is usually carried out by heating a mixture of salicylaldehyde, acetic anhydride, and anhydrous sodium acetate at reflux temperature, e. g., 135°–155° C., for a short time, after which the reaction mixture is cooled, washed, and the coumarin recovered therefrom by extraction with a solvent or by fractional distillation. However, under such conditions, the condensation is accompanied by the formation of tars, resins, etc., and the desired product is invariably obtained in yields far below the theoretical. Gnehm (Ber. vol. 14, page 262), for example, reports that the best possible yield is about 38 per cent.

We have now found that yields as high as 75 per cent of the theoretical (based on the salicylaldehyde consumed) may be realized by carrying out the above-described condensation in the presence of a catalyst consisting of an oxide or a salt of one of the metals of group seven or eight of the periodic system, e. g., ferric chloride, palladium chloride, nickel oxide, manganese chloride, cobalt acetate, ferric benzoate, platinum chloride, manganese sulphate, cobalt oxide, ferric nitrate, ferric bromide, etc. When carried out in the presence of such catalyst, the reactions occur smoothly and go to completion in a relatively short time without formation of excessive amounts of tar.

The condensation may advantageously be carried out by heating a mixture of salicylaldehyde, acetic anhydride, anhydrous alkali-metal acetate, and catalyst at reflux temperature for 4–10 hours, although we prefer to carry out the reaction for the formation of acetyl-salicylaldehyde (represented by Equation 1 above) at a somewhat lower temperature than the subsequent reactions (represented by Equations 2 and 3), since slightly increased yields of coumarin are obtained when operating according to such procedure. Accordingly, the mixture of reactants is usually heated at approximately 120°–160° C. for 2–4 hours after which the temperature is gradually increased to 170°–190° C., which temperature is maintained for 2–6 hours.

The reactants may be employed in any desired proportions, but it is preferable to employ approximately 1.5–2.5 moles of acetic anhydride and 1–2 moles of anhydrous alkali-metal acetate per mole of salicylaldehyde. The catalyst is ordinarily employed in an amount representing 1–3 per cent by weight of the salicylaldehyde present.

Upon completion of the reaction, the mixture is cooled and digested with water to dissolve the alkali-metal acetate and to decompose any unreacted acetic anhydride. The oil which separates is extracted with a solvent such as benzene, acetone, etc., and the extract is fractionally distilled under reduced pressure whereby substantially pure coumarin is obtained. If desired, the product may be further purified by crystallization from ethanol or other suitable solvent. It will be understood, of course, that other procedure may be followed in separating coumarin from the reaction mixture. For example, the mixture may be extracted directly with an organic solvent such as benzene or acetone, and the extract fractionally distilled to obtain coumarin, acetic anhydride, and any unreacted salicylaldehyde and/or salicylaldehyde acetate. Sodium acetate is not soluble in such solvents and is recovered in anhydrous form suitable for re-use without drying.

The following examples illustrate several ways in which the principle of the invention has been applied, but are not to be construed as limiting the same:

Example 1

A mixture of 3690 grams (32 moles) of salicylaldehyde, 6190 grams (60.6 moles) of acetic anhydride, 4960 grams (60.5 moles) of anhydrous sodium acetate, and 128 grams of cobaltous chloride hexahydrate was placed in a vessel fitted with a stirrer, thermometer, and condenser. The mixture was heated with stirring at 150° C. for 2 hours, during which time 4440 grams of a mixture of acetic acid and acetic anhydride was distilled from the reaction mixture. The temperature was then gradually raised to 180° C. and maintained at 180°–195° C. for 3 hours. The reaction mass was cooled to about 115° C., diluted with about 25 liters of hot water, and the mixture agitated for 15 minutes. The mixture was then allowed to stand whereupon it separated into two layers. The upper, aqueous layer was extracted with 7 liters of benzene, and the benzene extract added to the non-aqueous layer. The benzene was distilled off and the residue fractionally distilled under reduced pressure to obtain 310 grams of a mixture of unreacted salicylaldehyde and salicylaldehyde acetate, and 2920 grams of coumarin having a melting point of 67.1 C. The yield of coumarin was 64.5 per cent of the theoretical, based upon the salicylaldehyde initially employed.

Example 2

A mixture of 61 grams (0.5 mole) of salicylaldehyde, 82 grams (1.0 mole) of anhydrous sodium acetate, 102 grams (1.0 mole) of acetic anhydride, and 1 gram of fused nickelous chloride was placed in a flask fitted with a stirrer, thermometer, and condenser. The mixture was heated at 150° C. for 2 hours and thereafter heated at 180°–185° for 3 hours. During the heating, 42 grams of acetic acid was distilled from the mixture. The reaction mixture was cooled, diluted with 400 cc. of water, and allowed to separate into layers. The lower, non-aqueous layer was extracted with 300 cc. of benzene and the extract was fractionally distilled under reduced pressure to obtain 8 grams of a mixture of unreacted salicylaldehyde and salicylaldehyde acetate, and 44 grams of coumarin, corresponding to a yield of 60.1 per cent of the theoretical, based on the salicylaldehyde initially employed.

Example 3

A mixture of 61 grams (0.5 mole) of salicylaldehyde, 102 grams (1.0 mole) of acetic anhydride, 82 grams (1.0 mole) of anhydrous sodium acetate, and 1 gram of ferric chloride was heated at 150° C. for 2 hours and at 170°–190° C. for 3 hours as in Example 2. The reaction mixture was diluted with water, extracted with benzene, and the extract fractionally distilled under reduced pressure. There were obtained 15 grams of a mixture of unreacted salicylaldehyde and salicylaldehyde acetate, and 43 grams of coumarin. The yield was 59.8 per cent of the theoretical, based on the salicylaldehyde initially employed.

Example 4

A mixture of 61 grams (0.5 mole) of salicylaldehyde, 102 grams (1.0 mole) of acetic anhydride, 49 grams (0.5 mole) of anhydrous potassium acetate, and 2 grams of cobaltous oxide was heated at 150°–155° C. for 2 hours and at 180°–185° C. for 4 hours as in Example 2. The reaction product was diluted with water, extracted with benzene, and the benzene extract fractionally distilled. There were obtained 7 grams of a mixture of unreacted salicylaldehyde and salicylaldehyde acetate, and 39 grams (0.27 mole) of coumarin.

Example 5

A mixture of 61 grams (0.5 mole) of salicylaldehyde, 102 grams (1.0 mole) of acetic anhydride, 82 grams (1.0 mole) of anhydrous sodium acetate and 2 grams of cobaltous acetate tetrahydrate, was heated at 150° C. for 2.5 hours and at 180° C.–185° C. for 3 hours as in Example 2. The reaction product was diluted with water, extracted, and fractionally distilled. There were obtained 7.5 grams of a mixture of unreacted salicylaldehyde and salicylaldehyde acetate, and 46.5 grams of coumarin. The yield of coumarin was 63.6 per cent of the theoretical, based on the salicylaldehyde initially employed.

Example 6

A mixture of 61 grams (0.5 mole) of salicylaldehyde, 102 grams (1.0 mole) of acetic anhydride, 82 grams (1.0 mole) of anhydrous sodium acetate, and 1.5 grams of nickelic oxide was heated at 140°–150° C. for 1.5 hours and at 175°–190° C. for 5 hours, and the reaction product treated as in Example 2. The yield of coumarin was 59.6 per cent of the theoretical, based on the salicylaldehyde initially employed.

Example 7

A mixture of 61 grams (0.5 mole) of salicylaldehyde, 102 grams (1.0 mole) of acetic anhydride, 82 grams (1.0 mole) of anhydrous sodium acetate, and 1 gram of palladium chloride was heated as in Example 2, and the reaction product diluted with water and fractionally distilled. There was obtained 11.0 grams of a mixture of unreacted salicylaldehyde and salicylaldehyde acetate, and 45.5 grams of coumarin, corresponding to a yield of 62.4 per cent of the theoretical, based on the salicylaldehyde initially employed.

Example 8

A mixture of 61 grams (0.5 mole) of salicylaldehyde, 102 grams (1.0 mole) of acetic anhydride, 82 grams (1.0 mole) of anhydrous sodium acetate, and 1.5 grams of manganous acetate was heated as in Example 2. There was obtained 14.0 grams of a mixture of unreacted salicylaldehyde and salicylaldehyde acetate, and 45.5 grams (0.32 mole) of coumarin.

The invention is not limited to the use of pure salicylaldehyde as the starting material in the preparation of coumarin. If desired, salicylaldehyde acetate or a mixture of salicylaldehyde and salicylaldehyde acetate may be reacted according to the invention to produce coumarin in high yields. A convenient mode of operation consists in heating salicylaldehyde and a mixture of salicylaldehyde and salicylaldehyde acetate recovered from a previous run, with acetic anhydride and sodium acetate in the presence of one of the new catalysts in accordance with the procedure hereinbefore described. Examples 9 and 10 illustrate such alternative modes of operation:

Example 9

A mixture of 54.7 grams (0.33 mole) of salicylaldehyde acetate, 51.0 grams (0.5 mole) of acetic anhydride, 41 grams (0.5 mole) of anhydrous sodium acetate, and 0.7 gram of cobaltous chloride was heated at 180°–185° C. for 2.5 hours. The reaction product was cooled, diluted with water, and extracted with benzene. The benzene extract was fractionally distilled to obtain 29.4 grams (0.21 mole) of coumarin.

Example 10

A mixture of 244.0 grams of salicylaldehyde, 61 grams of a mixture of salicylaldehyde and salicylaldehyde acetate recovered from a previous run, 205 grams of anhydrous sodium acetate, 637.5 grams of acetic anhydride, and 8 grams of cobaltous chloride was heated at 150°–160° C. for 2 hours and at 180°–182° C. for 5.5 hours as in Example 1. The reaction product was cooled, diluted with water, and extracted with benzene. 227 grams of coumarin was obtained by fractional distillation of the benzene extract.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:

1. In a method of making coumarin by chemically condensing acetic anhydride and an alkali-metal acetate with an agent selected from the class consisting of salicylaldehyde and salicylaldehyde acetate, the step which consists in carrying out the condensation in the presence of a catalyst selected from the class consisting of the oxides and salts of the metals of groups seven and eight of the periodic system.

2. In a method of making coumarin by chemically condensing acetic anhydride and sodium acetate with an agent selected from the group consisting of salicylaldehyde and salicylaldehyde acetate, the step which consists in carrying out the reaction in the presence of a chloride of a metal of groups seven and eight of the periodic system.

3. In a method of making coumarin, the step which consists in reacting acetic anhydride, anhydrous sodium acetate, and an agent selected from the class consisting of salicylaldehyde and salicylaldehyde acetate in the presence of cobaltous chloride.

4. In a method of making coumarin, the step which consists in reacting acetic anhydride, anhydrous sodium acetate, and an agent selected from the class consisting of salicylaldehyde and salicylaldehyde acetate in the presence of nickelous chloride.

5. In a method of making coumarin, the step which consists in reacting acetic anhydride, anhydrous sodium acetate, and an agent selected from the class consisting of salicylaldehyde and salicylaldehyde acetate in the presence of ferric chloride.

6. In a method of making coumarin, the steps which comprise heating an agent selected from the class consisting of salicylaldehyde and salicylaldehyde acetate with between substantially 1.5 and substantially 2.5 molecular equivalents of acetic anhydride and between substantially 1.0 and substantially 2.0 molecular equivalents of an anhydrous alkali-metal acetate in the presence of a catalyst selected from the class consisting of the oxides and salts of the metals of groups seven and eight of the periodic system at a temperature between substantially 120° C. and substantially 160° C. for from 2 to 4 hours, continuing the heating at a temperature between substantially 170° C. and substantially 190° C. for from 2 to 6 hours, separating coumarin and any unreacted salicylaldehyde and salicylaldehyde acetate from the reaction mixture, and returning any such salicylaldehyde and salicylaldehyde acetate to the reaction.

7. In a method of making coumarin, the steps which comprise heating an agent selected from the class consisting of salicylaldehyde and salicylaldehyde acetate with between substantially 1.5 and substantially 2.5 molecular equivalents of acetic anhydride and between substantially 1.0 and substantially 2.0 molecular equivalents of anhydrous sodium acetate in the presence of a chloride of a metal of groups seven and eight of the periodic system at a temperature between substantially 120° C. and substantially 160° C. for from 2 to 4 hours, continuing the heating at a temperature between substantially 170° C. and substantially 190° C. for from 2 to 6 hours, separating coumarin and any unreacted salicylaldehyde and salicylaldehyde acetate from the reaction mixture, and returning any such salicylaldehyde and salicylaldehyde acetate to the reaction.

8. In a method of making coumarin, the steps which comprise heating an agent selected from the group consisting of salicylaldehyde and salicylaldehyde acetate, with between substantially 1.5 and substantially 2.5 molecular equivalents of acetic anhydride and between substantially 1.0 and substantially 2.0 molecular equivalents of anhydrous sodium acetate in the presence of cobaltous chloride at a temperature between substantially 120° C. and 160° C. for from 2 to 4 hours, continuing the heating at a temperature between substantially 170° C. and substantially 190° C. for from 2 to 6 hours, separating coumarin and any unreacted salicylaldehyde and salicylaldehyde acetate from the reaction mixture, and returning any such salicylaldehyde and salicylaldehyde acetate to the reaction.

9. In a method of making coumarin, the steps which comprise heating an agent selected from the class consisting of salicylaldehyde and salicylaldehyde acetate with between substantially 1.5 and substantially 2.5 molecular equivalents of acetic anhydride and between substantially 1.0 and substantially 2.0 molecular equivalents of anhydrous sodium acetate in the presence of nickelous chloride at a temperature between substantially 120° C. and 160° C. for from 2 to 4 hours, continuing the heating at a temperature between substantially 170° C. and substantially 190° C. for from 2 to 6 hours, separating coumarin and any unreacted salicylaldehyde and salicylaldehyde acetate from the reaction mixture, and returning any such salicylaldehyde and salicylaldehyde acetate to the reaction.

10. In a method of making coumarin, the steps which comprise heating an agent selected from the class consisting of salicylaldehyde and salicylaldehyde acetate with between substantially 1.5 and substantially 2.5 molecular equivalents of acetic anhydride and between substantially 1.0 and substantially 2.0 molecular equivalents of sodium acetate in the presence of ferric chloride at a temperature between substantially 120° C. and 160° C. for from 2 to 4 hours, continuing the heating at a temperature between substantially 170° C. and substantially 190° C. for from 2 to 6 hours, separating coumarin and any unreacted salicylaldehyde and salicylaldehyde acetate from the reaction mixture, and returning any such salicylaldehyde and salicylaldehyde acetate to the reaction.

11. In a method of making coumarin, the steps which consist in heating an agent selected from the class consisting of salicylaldehyde and salicylaldehyde acetate with between substantially 1.5 and substantially 2.5 molecular equivalents of acetic anhydride and between substantially 1.0 and substantially 2.0 molecular equivalents of an anhydrous alkali-metal acetate in the presence of a catalyst selected from the class consisting of the oxides and salts of the metals of groups seven and eight of the periodic system at a temperature between substantially 120° C. and substantially 160° C. for from 2 to 4 hours, continuing the heating at a temperature between substantially 170° C. and substantially 195° C. for from 2 to 6 hours, separating a mixture of coumarin and any unreacted salicylaldehyde and salicylaldehyde acetate from alkali-metal acetate, separating coumarin from any such salicylaldehyde and salicylaldehyde acetate, and returning said salicylaldehyde and salicylaldehyde acetate and said alkali-metal acetate to the reaction.

EDGAR C. BRITTON.
JOHN E. LIVAK.